United States Patent [19]

Lange

[11] Patent Number: 4,623,775
[45] Date of Patent: Nov. 18, 1986

[54] ARTICULATED RESISTANCE WELDING ELECTRODE WITH UNIVERSAL MOVEMENT

[75] Inventor: Kevin M. Lange, Auburn Heights, Mich.

[73] Assignee: General Motors Corp., Detroit, Mich.

[21] Appl. No.: 798,443

[22] Filed: Nov. 15, 1985

[51] Int. Cl.[4] .................. B23K 9/24; B23K 11/30; H05B 3/03
[52] U.S. Cl. .................. 219/120; 219/86.31; 219/89; 219/119
[58] Field of Search ............... 219/86.25, 86.31, 86.51, 219/89, 119, 120

[56] References Cited

U.S. PATENT DOCUMENTS 4,091,255  5/1978  Yamamoto .................. 219/119
4,140,891  2/1979  Lenox ........................ 219/120

Primary Examiner—Harold Broome
Assistant Examiner—Lincoln D. Donovan
Attorney, Agent, or Firm—Robert M. Sigler

[57] ABSTRACT

A resistance welding electrode for producing spot welds on a workpiece without marring comprises a hollow electrically conductive shank for conducting welding current and pressurized cooling fluid, an electrode head affixed to a rigid, electrically insulating, tubular housing having a flange with a groove and surrounding the free end of the shank, a spring engaging the shank and tubular housing to bias the head out of engagement with the free end of the shank and a ring of resilient, fluid sealing material retained in the groove to engage the shank and form a chamber with the tubular housing and head for cooling fluid from the shank. The ring allows rocking movement of the tubular housing and head relative to the shank so that the workpiece contact area may conform to the workpiece when welding pressure is applied to the shank. The ring further allows axial translation between the tubular housing and shank under welding pressure to permit contact between the head and shank for welding current flow therebetween and axial separation of the head and shank due to fluid pressure and the force of the spring when the welding pressure is removed.

3 Claims, 2 Drawing Figures

ARTICULATED RESISTANCE WELDING ELECTRODE WITH UNIVERSAL MOVEMENT

BACKGROUND OF THE INVENTION

This invention relates to resistance welding electrodes and particularly to such electrodes having a universally movable head to conform to a non-normal workpiece surface.

In the practice of resistance welding it is often desirable to use a welding electrode having a swivel head to conform to workpiece surface areas which are not normal to the chief axis of the electrode. This feature is particularly important where it is desired to minimize marring of a workpiece surface area by electrode indentation. Further, in such applications, it is desired to use extraordinarily good cooling of the electrode and workpiece to prevent marring the workpiece and hindering the swivel action.

In the U.S. Pat. No. 4,140,891, to Lenox issued Feb. 20, 1979, a resistance welding electrode is shown which is formed of a hollow shank carrying current and cooling fluid and an electrode head connected to the shank by a flexible housing of insulating material. The housing forms a chamber to contain the cooling fluid supplied through the shank. The flexibility of the housing allows the head to rock relative to the shank and also to move axially away from the shank under the influence of the pressure of the cooling fluid. When welding pressure is applied through the electrode to a workpiece, the shank is forced against the head to provide firm electrical engagement between those elements. This electrode is a great improvement over other commercially available electrodes, such as those of the ball and socket variety, which do not properly handle large welding currents and which may tend to hang up in off center positions and thus dent the workpiece when brought into contact therewith. However, the Lenox electrode flexible housing has been difficult to manufacture and has demonstrated difficulty containing the cooling fluid at full operating pressures.

SUMMARY OF THE INVENTION

Therefore, it is an object of this invention to provide an easily manufacturable resistance welding electrode of the swivel type in which the electrode head easily moves relative to the electrode shank without significant frictional resistance and may be separated from the shank between welding events to allow free circulation of cooling fluid about the head and shank.

The invention is carried out by replacing the flexible housing of the Lenox electrode with a rigid tubular housing affixed to the head and surrounding the portion of the shank adjacent the head and a ring of electrically insulating, resilient, fluid sealing material retained in a groove in the tubular housing and adapted to engage the shank and thereby form a chamber with the tubular housing and inner wall of the head communicating with the interior of the shank to contain pressurized cooling fluid. The ring serves as a pivot member to allow rocking movement of the tubular housing and head about an axis perpendicular to the shank so that the workpiece contact area may conform to the workpiece when welding pressure is applied to the shank and further allows axial translation between the tubular housing and shank under welding pressure to permit contact between the head and shank for welding current flow therebetween. Spring means are provided to assist cooling fluid pressure in separating the head and shank when the welding pressure is removed.

The rigid tubular housing and flexible insulating ring are easily manufacturable replacements for the flexible housing of Lenox which, when combined in the claimed combination, provide all the functions of the Lenox welding electrode. Further details and advantages of this invention will be apparent from the accompanying drawings and following description of the preferred embodiment.

DESCRIPTION OF THE PREFERRED EMBODIMENT

Figure 1:
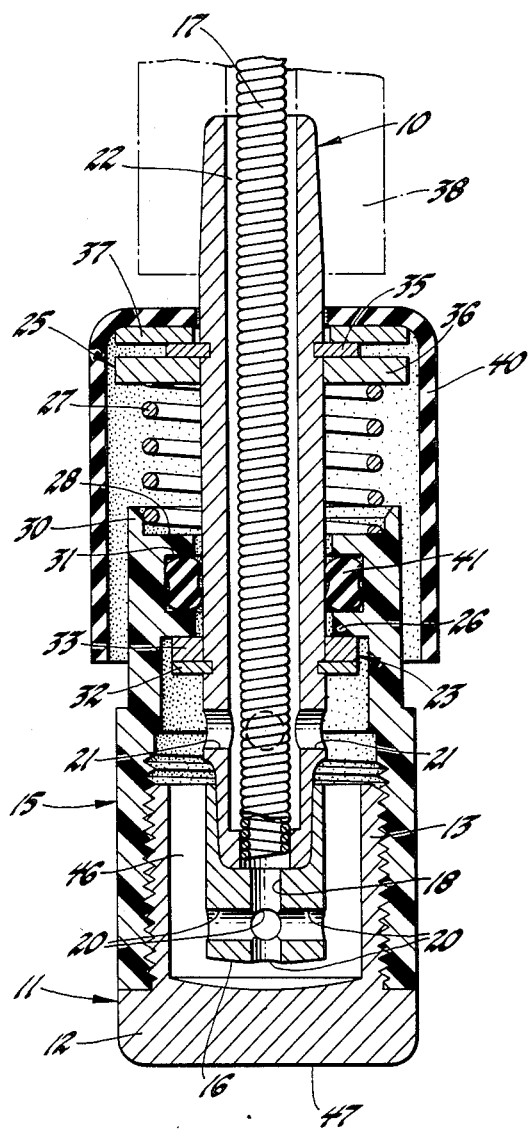
FIG. 1 is a cross sectional elevational view of a welding electrode according to this invention in the separated, non-welding state.

Referring to FIG. 1, the resistance welding electrode according to the invention comprises a hollow copper shank 10, of one or two piece construction, extending upward to support means 38 and supply means, not shown, for fluid and current. A large surface area copper electrode 11 is adjacent but separated from free end 16 of shank 10. Electrode 11 comprises a contact head 12 with a tubular, threaded attachment portion 13 extending axially therefrom and a workpiece contact area 47. A rigid tubular housing 15 is made of an electrically insulating, high temperature polymer and threadably attached to attachment portion 13 and extends generally axially upward in FIG. 1 to surround a significant length of shank 10.

Shank 10 is hollow and includes a fluid conduction tube 17, which is engaged with shank 10 near the free end thereof and opens into a system of connected conduits 18 ending in fluid circulating ports 20 in the free end 16 of shank 10. Slightly further from its free end 16, shank 10 is pierced with fluid circulating ports 21, which open to the annular chamber 22 defined between shank 10 and tube 17 contained therein. Shank 10 is thus adapted to carry cooling fluid from a source through tube 17 and ports 20 to the exterior of shank 10 and back through ports 21 and chamber 22 for recooling and recirculation.

Shank 10 includes a pair of flanges 23, 25 further from free end 16 than either set of ports 20 or 21. Flange 23 is closest to free end 16 and comprises a stainless steel retaining ring 32 and washer 33; and flange 25 is farther therefrom and comprises a stainless steel retaining ring 35 and washers 36 and 37. Each of flanges 23, 25 extends radially outward from shank 10. Tubular housing 15 is provided with a flange 26 which extends radially inward sufficiently to axially engage flange 23 but not so far as to interfere with the remainder of shank 10. A coil spring 27 is disposed between flange 25 of shank 10 and the end 28 of tubular housing 15 opposite head 12 of electrode 11 and retained on tubular housing 15 by rim 30. Spring 27 exerts an expansive bias to normally urge tubular housing 15 toward free end 16 of shank 10 until flanges 23 and 26 are engaged, with the free end of shank 10 separated from head 12 of electrode 11.

Flange 26 of tubular housing 15 is provided with a groove 31 to retain a ring 41 of resilient, fluid sealing material. The first such ring found to allow the necessary movement without leakage was an O-ring with a four lobed cross section: specifically, the quad doublebak (R) series 44 seal made of a fluoroelastomer or neoprene by the Minnesota Rubber Company. A preferred ring, due to lower cost and greater availability, is an O-ring of similar material and a circular cross section. Almost any cross section should work acceptably if it is sufficiently large and is put under sufficient radial compression in the groove. Sealing ring 41, shank 10 and housing 15 form a chamber 46 into which the cooling fluid may flow from tube 17 and from which the cooling fluid may flow back through chamber 22 within shank 10. A protective rubber boot 40 may be included to extend over the spring and seal area of the welding electrode to protect it from weld flash and dirt.

FIG. 1 shows the electrode disengaged from the welding surface. The pressure of the cooling fluid, normally 50 psi, and the force of spring 27 keep head 12 of electrode 11 separated from shank 10; and spring 27 and sealing ring 41 combine to keep head 12 and housing 15 axially aligned with shank 10. The separation of head 12 from shank 10 facilitates cooling of both between welds by the cooling fluid supplied through shank 10 and further provides a cushioning effect to occur when weld pressure is applied to a workpiece.

Figure 2:
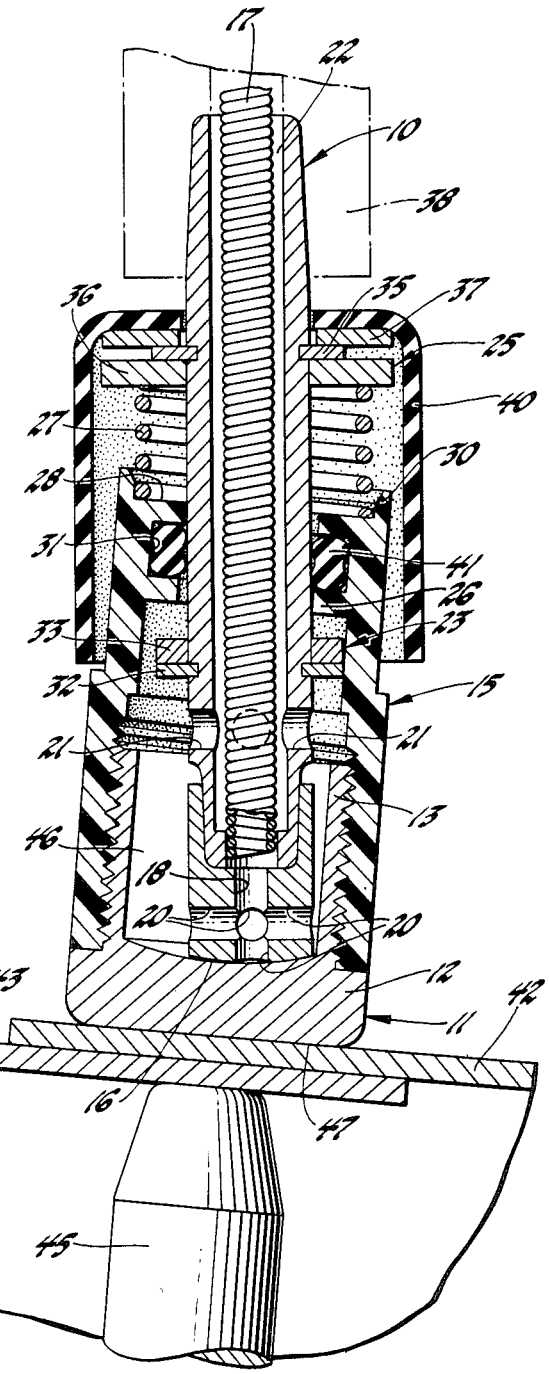
FIG. 2 is a cross sectional elevational view of the welding electrode of FIG. 1 in the welding state against a non-normal surface.

The electrode in FIG. 2 is shown in position for making a weld, that is, it is pressed against overlapping workpieces 42, 43 and an opposing conventional electrode 45 on the other side of the workpieces to complete the welding circuit. Since the work engaging surface of head 11 is very large relative to the size of electrode 45 and the size of the weld nugget to be formed will be consistent with the smaller electrode, the welding force applied by head 12 is distributed over portions of workpiece 42 not softened by the welding so that little or no indentation occurs on the portion of the workpiece contacting head 12. The cooling fluid supplied from shank 10 removes heat from head 12 shank 10 and housing 15. A convex spherical surface on free end 16 of shank 10, together with ring 41, allows rocking movement of housing 15 and head 12 about the sealing ring 41 as a pivot relative to shank 10 as head 12 is being urged into contact with the workpieces, which are shown as being not perpendicular thereto, thereby allowing the head to conform to the workpieces by pivoting on ring 41 about an axis perpendicular to the axis of shank 10 up to an angle of about 5 degrees from perpendicular. Sealing ring 41 thus has several functions in the electrode: (1) as a pivot member to allow the desired rocking movement of head 12; (2) as a sliding member to allow alternate engagement and disengagement of head 12 and shank 10; and (3) as a sealing member to prevent leakage of cooling fluid from chamber 46. It may also aid in the alignment of head 12 with shank 10 between welds. In addition, sealing ring 41 is commercially available and housing 15 is easily manufactured.

The embodiments of the invention in which an exclusive property or privilege is claimed are defined as follows:

1. A resistance welding electrode for producing spot welds on a workpiece comprising:
    a hollow electrically conductive shank for conducting welding current and pressurized cooling fluid, the shank having a free end and including a pair of axially spaced flanges extending radially outwardly therefrom and fluid circulating ports between the free end and the flange adjacent the free end;
    an electrode head located adjacent the free end of the shank, the head having a workpiece contact area;
    a rigid, electrically insulating, tubular housing affixed to the head and surrounding a portion of the shank, the tubular housing including a flange extending radially inward between the flanges of the shank and adapted to engage the flange of the shank nearest the free end thereof, the flange of the tubular housing having a groove facing the shank;
    a spring engaging the other flange of the shank and the tubular housing, the spring being effective to bias the flange of the tubular housing into engagement with the flange of the shank nearest the free end thereof; and
    a ring of resilient, fluid sealing material retained in the groove and adapted to engage the shank and thereby form a chamber with the tubular housing and head communicating with the fluid circulating ports of the shank to receive pressurized cooling fluid, the ring further acting as a pivot member to allow rocking movement of the tubular housing and head about an axis perpendicular to the shank so that the workpiece contact area may conform to the workpiece when welding pressure is applied to the shank, the ring further allowing axial translation between the tubular housing and shank under welding pressure to permit contact between the head and shank for welding current flow therebetween and also allowing axial separation of the head and shank due to fluid pressure and the force of the spring when the welding pressure is removed.

2. The resistance welding electrode of claim 1 in which the ring of resilient, fluid sealing material has a four lobed cross section.

3. The resistance welding electrode of claim 1 in which the ring of resilient, fluid sealing material has a circular cross section.

* * * * *